United States Patent [19]

Hiramatsu et al.

[11] E Patent Number: Re. 33,537

[45] Reissued Date of Patent: Feb. 12, 1991

[54] ULTRAHIGH STRENGTH CARBON FIBERS

[75] Inventors: Tohru Hiramatsu, Matsuyama; Yohji Matsuhisa, Ehime; Tomitake Higuchi, Nagoya, all of Japan

[73] Assignee: Toray Industries, Inc., Tokyo, Japan

[21] Appl. No.: 298,581

[22] Filed: Jan. 18, 1989

Related U.S. Patent Documents

Reissue of:

[64] Patent No.: 4,637,925
Issued: Jan. 20, 1987
Appl. No.: 854,979
Filed: Apr. 23, 1986

U.S. Applications:

[62] Division of Ser. No. 746,687, Jun. 20, 1985, Pat. No. 4,600,572.

[30] Foreign Application Priority Data

Jun. 22, 1984 [JP] Japan ..... 59-127389
Jun. 22, 1984 [JP] Japan ..... 59-127390

[51] Int. Cl.[5] ..... D01C 5/06; D01F 9/22

[52] U.S. Cl. ..... 423/447.4; 423/447.2; 423/447.7; 264/29.2

[58] Field of Search ..... 423/447.2, 447.1, 447.6, 423/447.8; 264/29.2; 204/173, 79

[56] References Cited

U.S. PATENT DOCUMENTS

| | | | |
|---|---|---|---|
| 3,657,082 | 4/1972 | Wells et al. | 423/447.2 |
| 3,746,560 | 7/1973 | Goan et al. | 423/447.1 |
| 4,070,446 | 1/1978 | Horikiri et al. | 423/447.4 |
| 4,073,869 | 2/1978 | Kolmin | 423/447.2 |
| 4,113,847 | 9/1978 | Fukushima et al. | 423/447.4 |
| 4,131,644 | 12/1978 | Nagasaka et al. | 423/447.5 |
| 4,349,523 | 9/1982 | Hiramatsu et al. | 423/447.4 |
| 4,555,393 | 11/1985 | Sorensen et al. | 423/447.2 |

FOREIGN PATENT DOCUMENTS

| | | | |
|---|---|---|---|
| 55-71613 | 5/1980 | Japan | 423/447.4 |
| 59-187624 | 10/1984 | Japan | 264/29.2 |

*Primary Examiner*—Olik Chaudhuri
*Assistant Examiner*—Robert M. Kunemund
*Attorney, Agent, or Firm*—Armstrong, Nikaido, Marmelstein, Kubovcik & Murray

[57] ABSTRACT

An ultrahigh strength carbon fiber having a surface layer having a crystalline completeness which is substantially the same as or higher than that of the central region of the fiber, and a functional group amount ratio [$(O_{ls}/C_{ls})$] $(O_{1s}/C_{1s})$ of 0.1 to 0.4 as detected in the fiber surface by X-ray photoelectron spectroscopy, the surface layer preferably having an ultrathin outermost layer having a lower crystalline completeness than the central region of the fiber.

5 Claims, 2 Drawing Sheets

ULTRAHIGH STRENGTH CARBON FIBERS

Matter enclosed in heavy brackets [ ] appears in the original patent but forms no part of this reissue specification; matter printed in italics indicates the additions made by reissue.

This *application is a reissue of application No. 854,979, filed Apr. 23, 1986, and* is a division of application Ser. No. 746,687 filed June 20, 1985 now U.S. Pat. No. 4,600,572 July 3, 1986.

BACKGROUND

This invention relates to carbon fibers having a novel fiber structure, which can provide a composite material having an ultrahigh strength in comparison with conventional carbon-fiber reinforced composite materials, and more particularly, carbon fibers which exhibit an ultrahigh strength of at least 500 kg/mm$^2$, more preferably about 600 kg/mm$^2$ or greater in terms of the resinimpregnated strand strength.

Carbon fibers have already been industrially produced and widely employed for use as reinforcing fibers for composite materials utilizing remarkable mechanical properties, particularly the specific strength and the specific modulus of carbon fibers, but in connection with such known composite materials, particularly those for use in the field of aeronautical and/or aerospace industries, it has been increasingly strongly demanded that an enhancement is met of the strength of carbon fibers.

To cope with such demand, there have already been some propositions made, but the carbon fibers pertaining to those propositions do not necessarily exhibit such a mechanical strength which can fully satisfy the demand. Particularly, there still lies a problem such that even if the mechanical strength of the carbon fiber itself can be improved, the improved mechanical strength of the carbon fiber is not made contributive to an enhancement of the mechanical strength of a composite material, that is to say, generally low are degrees of utilization made of the strength of carbon fibers. Besides, the known or proposed processes for the production of carbon fibers involve complex steps and/or difficulties in controlling production conditions, and they are problematic as an industrial production method.

Also, in the production of composite materials comprising carbon fibers as their reinforcing fibers, whereas it is sought for to obtain an improvement in or relating to the ease of handling of carbon fiber bundles (multifilaments) in the process of forming the composite material and also in the resin-impregnated strand strength of carbon fibers, the known carbon fiber bundles do not afford a desirable ease of handling; for example, they easily tend to undergo breakage, fluffing and so forth in the processes of winding-up thereof and/or preparation of prepregs, and their mechanical strength is at highest about 570 kg/mm$^2$ in terms of the resin-impregnated strand strength and at highest about 520 Kg/mm$^2$ in terms of the average filament strength.

Furthermore, with the known carbon fibers of which the mechanical strength is improved as above, they generally have a high resin dependency, that is to say, their resin-impregnated strand strength varies depending upon the kind of the matrix resin used in the composite. Thus, they have a defect that the mechanical strengths thereof, even though improved, are not sufficiently translated in composite materials due to their high dependency on a matrix resin.

Carbon fibers are usually subjected to an electrolysis treatment to generate functional groups on the surface thereof and improve the adhesion of the fiber to the matrix resin and the interlayer shear strength (ILSS) of a composite material prepared from the fiber (see, for example, Japanese Patent Publication No. 20033/1980). However, this treatment is only to improve the adhesion of the carbon fiber to the matrix resin, and cannot be expected to improve the tensile strength of the fiber itself or a composite material prepared therefrom.

On the other hand, in order to improve the strenth of carbon fibers itself, there have been proposed processes comprising imersing carbon fibers in an inorganic acid such as concentrated sulfuric acid, nitric acid or phosphoric acid for a long time to etch the surface of the fiber, and subsequently subjecting the fiber thus etched to a heating treatment in a hightemperature inert atmosphere to remove the functional groups formed on the surface of the fiber by the above-mentioned inorganic acid immersion treatment (see, for example, Japanese Patent Application Laying-open Publication No. 59497/1979, and Japanese Patent Publication No. 35796/1977). According to the disclosure in the Japanese Patent Application Laying-open Publication No. 59497/1979, such an etching treatment serves to remove the surface layer of the fiber together with flaws formed on the surface of the fiber in the course of the process of production of the carbon fiber to improve the mechanical strength of the carbon fiber.

One of the inventors of the present invention found that, in the process comprising subjecting carbon fibers to a chemical oxidation treatment and heating the oxidized carbon fibers in an inert atmosphere to remove the functional groups on the fiber surface, the average filament strength of the carbon fibers obtained is largely improved, by suitably selecting the treatment conditions under which the surface layer region of carbon fibers can be selectively rendered amorphous, and proposed a process involving such treatment conditions (Japanese Patent Application Laying-open Publication No. 214527/1983). However, despite the treatment conditions so specified, it turned out that the resinimpregnated strand strength of the treated carbon fibers has a high resin dependency, thus presenting a problem in practicability.

More specifically, it was found that, when carbon fibers are subjected to a severe treatment by which the fiber surface becomes etched spite of an extremely high chemical resistance thereof, the obtained carbon fibers are damaged not only in the surface layer region but also, in some cases, in an inner region, thus not always resulting in an improvement in the mechanical strength, and that, despite any improvement in the mechanical strength of the carbon fiber, the resinimpregnated strand strength thereof is not improved, thus failing to contribute to any improvement in the tensile strength of a composite material prepared therefrom. Particularly, it was turned out that, as the mechanical strength of carbon fibers to be subjected to the etching treatment with an inorganic acid is increased, the improvement in the strength of carbon fibers attained by this treatment is reduced to thereby provide little expectation of any marked improvement in the resinimpregnated strand strength, and that, in addition, the mechanical strength of a composite material prepared from carbon fibers subjected to the above-mentioned treatment has a higher resin dependency.

SUMMARY

An object of this invention is to provide a carbon fiber having a novel fiber structure different from the fiber structures formed by the foregoing known electrolysis or inorganic acid etching treatment, and exerting a superior reinforcing effect due to such a novel fiber structure.

Another object of this invention is to provide a carbon fiber not only greatly contributing to an improvement in the tensile strength of a composite material prepared therefrom but also providing an ultrahigh strength composite material having an extremely low resin dependency and being relieved of the defects and problems as above pointed out.

Still another object of the invention is to provide a process for producing a carbon fiber of the kind as described above which has excellent practical performances, particularly a treatment method of selectively removing a structural defect formed in the process of manufacturing carbon fibers to give the carbon fibers the above-mentioned fiber structure and reinforcement characteristics effective and useful as carbon fibers for reinforcing composite materials.

The above objects of the present invention is attained by a carbon fiber having a surface layer region wherein the level of crystalline completeness of the surface layer is substantially the same as that in the central region of the fiber and functional groups in the surface layer are substantially removed, preferably the amount of functional groups of the surface layer is within a range of 0.1 to 0.4 of the ratio $[(O_{ls}/C_{ls})]$ $(O_{1s}/C_{1s})$ detected by X-ray photoelectron spectroscopy.

In particular, the surface layer region of the carbon fiber of this invention has an ultrathin outermost layer in which the crystalline completeness is substantially lower than that in the central region of the fiber. Moreover, the carbon fiber of this invention is characterized in that the heat-decomposable organic components thereof, which is a parameter indicating the extent of removal of functional groups contained in carbon fibers, is in the range of 0.05 to 0.5 wt. %.

The carbon fiber of the present invention characterized as described above can be produced by electrochemically oxidation-treating carbon fibers formed from acrylic precursors as an anode with a quantity of electricity of about 100 to 600 coulomb per gram of the fiber in an electrolytic solution containing nitrate ions as an essential component and maintained at a temperature of at least 40° C., water-washing and drying the carbon fibers thus treated, and heating the dried carbon fibers in an inert or reducing atmosphere of about 600° to 1000° C. to remove functional groups on the surface of the carbon fibers.

THE DRAWINGS

DESCRIPTION

Figure 1A:
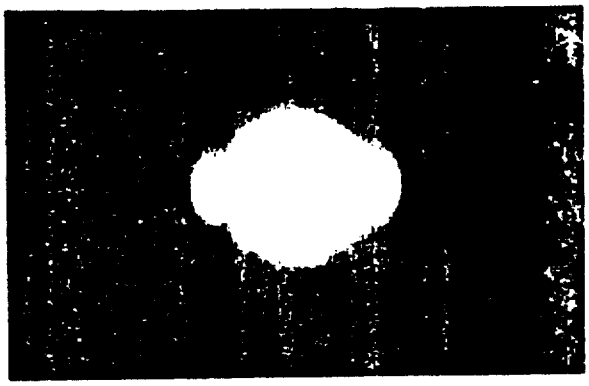
FIGS. 1A and 1B are respectively an electron diffraction pattern and a type diagram thereof, taken of an ultrathin slice of a carbon fiber according to electron diffractometry.

One of the structural features of the carbon fiber of this invention is that it has a surface layer region wherein the crystalline completeness is of a substantially same level as that in the central region, that its surface layer has an ultrathin outermost layer of which the crystalline completeness is lower than that in the central region, and that it is substantially removed of functional groups in its surface layer region. Only with such a fiber structure as described above, the mechanical properties of the carbon fiber of this invention can largely reflect its mechanical strength on the strength of a composite material composed of the carbon fibers and a resin matrix.

More specifically, formation of the abovementioned fiber structure may contribute to remove the physical strain in carbon fibers formed in the carbon fibers in the process of manufacture of the carbon fibers and remove a structural defect in the surface of carbon fibers. This is believed to advantageously serve to reflect the mechanical strength of the carbon fibers on the mechanical strength of the composite material.

In the carbon fiber of the present invention, functional groups are removed to such an extent that the amount of the functional groups represented by the ratio $[(O_{ls}/C_{ls})]$ $(O_{1s}/C_{1s})$ detected by X-ray photoelectron spectroscopy is 0.1 to 0.4, preferably 0.15 to 0.3, more preferably 0.20 to 0.25, while the amount of heat-decomposable organic components being 0.05 to 0.5% by weight, preferably 0.1 to 0.4% by weight, more preferably 0.15 to 0.30% by weight. Also, the carbon fiber of this invention should preferably have an average filament strength of at least 480 kg/mm$^2$, preferably 500 kg/mm$^2$ or more, more preferably 530 kg/mm$^2$ or more. When these requirements are satisfied, there appears an advantageous feature that, not only the mechanical strength of the carbon fibers is largely reflected on an improvement in the strength of the composite material prepared therefrom, but also the strength of the composite material does not vary depending on the kind of a matrix resin constituting the composite material, namely the composite material has little resin dependency.

The term "crystalline completeness" as used herein refers to a property indicative of crystallinity as determined in terms of the size of crystallites constituting the carbon fiber and regularity of arrangement of graphite basal planes. It is said that, as the crystalline completeness is higher, crystals are larger in size and higher in regularity of arrangement of carbon network.

The carbon fiber of this invention "with a surface layer region having substantially the same level of crystalline completeness as the central region of the fiber and an ultrathin outermost layer lower in the crystalline completeness than that in the above-mentioned central region of the fiber" is of a novel structural feature provided, for the first time, by a novel process for producing a carbon fiber according to the present invention but neither by the conventionally known electrolysis treatment nor by the conventionally known combination of the etching treatment with a conc. inorganic acid and the heat treatment in an inert atmosphere.

More specifically, the usual electrolysis treatment only generates functional groups on the surface of a carbon fiber to substantially improve the ILSS, but never forms a fiber structure "with the surface layer region having substantially the same level of the crystalline completeness as the central region of the fiber and an ultrathin outermost layer lower in the crystalline completeness than that in the above-mentioned central region of the fiber" as found in the carbon fiber of this invention. Accordingly, this treatment can improve neither the tensile strength of the carbon fiber itself nor the tensile strength of a composite material prepared therefrom. Additionally stated, when such severe conditions of the electrolysis treatment as will provide poorer crystalline completeness for the ultrathin surface layer region of a carbon fiber than that in the central region of the carbon fiber, for example, use of an extremely large quantity of electricity, is adopted, the amount of functional groups as detected in the surface of the carbon fiber obtained by X-ray photoelectron spectroscopy becomes large, the translation of the carbon fiber strength in a composite material prepared from the carbon fiber largely lowers, and the resin dependency increases. Thus superior effects as achieved in the present invention cannot be obtained.

The carbon fiber obtained by the etching treatment with a conc. inorganic acid, followed by a heat treatment in an inert atmosphere tends to lose the crystalline completeness not only in the surface region of the fiber but also up to the deep inner region thereof upon etching on the surface of the fiber (in other words, to have a larger (thicker) area of the surface layer region poorer in the crystalline completeness than the central region of the fiber), and to have incomplete inactivation because to a difficulty encountered in inactivating the whole region of the fiber surface layer (in other words, to be insufficiently stripped of functional groups in the whole region having an incomplete crystallinity). Thus, the content of heatdecomposable organic components in the carbon fiber obtained is high as compared with that of the carbon fiber of the present invention.

In the combination of the etching treatment with a conc. inorganic acid and the subsequent inactivation treatment, it may be possible to adopt an etching treatment condition under which the carbon fiber does not lose the crystalline completeness up to the deep inner layer region of the fiber. In this case, however, surface flaws of the carbon fiber cannot be effectively eliminated through the purpose of the etching treatment is removal of scratches. On the other hand, in order to inactivate the whole region having a damaged crystalline completeness and extending to the deep inner layer by removing functional groups therefrom, a severe inactivation treatment condition is required, which, however, may lower the mechanical strength of the carbon fiber itself. Thus, such a condition cannot provide an ultrahigh strength carbon fiber having an average filament strength of 480 kg/mm$^2$ or more, and rather leads to loss of the function of the carbon fiber as reinforcing fiber for a composite material prepared therefrom. As described above, the structural feature of the carbon fiber of this invention comprising a surface layer region having substantially the same level of the crystalline completeness as that in the central region of the carbon fiber and an ultrathin outermost layer easily stripped of functional groups cannot be obtained by the foregoing combination of the etching treatment with a conc. inorganic acid and the subsequent inactivation treatment, which, therefore, cannot provide the effects of the carbon fiber of this invention on an improvement of the utility of carbon fiber strength in a composite material and the decrease of resin dependency.

The crystalline completeness in any of the central region of the fiber, the surface layer region of the fiber, and the ultrathin outermost layer of the surface layer region is measured by transmission electron diffractometry (TEM). Specifically, as will be described later, the crystalline completeness in the surface layer region of the fiber or the ultrathin outermost layer of the surface layer region is compared with that in the central portion of the fiber, which is used as a standard. In this invention, by comparison, the surface layer region shows substantially the same level of the crystalline completeness as that in the central region of the fiber, and the ultrathin outermost layer of the surface layer region shows a poorer crystalline completeness than that in the central region of the fiber. According to the measurement method described later, the surface layer region is a layer of about 1.5 microns or less on the average in thickness measured from the surface of the carbon fiber, and the ultrathin outermost layer is a layer of about 0.2 micron or less, preferably 0.1 micron or less on the average in thickness measured from the surface of the carbon fiber.

The term "substantially the same level of the crystalline completeness as that in the central region of the fiber" is intended to mean that the ratio of the crystalline completeness in the surface layer region of the fiber to that in the central region of the fiber is substantially one or more and, in terms of a more precise numerical value, aboput 0.98 or more, preferably 1.0 or more.

The carbon fiber of this invention having an ultrathin outermost layer as described above is desired to have a functional group ratio $[(O_{1s}/C_{1s})]$ $(O_{1s}/C_{1s})$ of 0.1 to 0.4, preferably 0.15 to 0.4, more preferably 0.20 to 0.25 as detected by X-ray photoelectron spectroscopy. As for the heatdecomposable organic components in the carbon fiber which is a parameter indicative of the amount of chemical functional groups present in the surface and inside the carbon fiber, particularly mainly the amount of chemical functional groups present in the above-mentioned ultrathin outermost layer, the carbon fiber of the present invention is desired to have a content of heatdecomposable organic components, of 0.05 to 0.5 wt. %, preferably 0.1 to 0.4 wt. %, more preferably 0.15 to 0.30 wt. % as hereinbefore described. If the content is lower than 0.05 wt. %, the adhesion of a resin to the carbon fiber is unfavorably low. On the other hand, if the content is higher than 0.5%, inactivation of the carbon fiber is insufficient, unfavorably leading to a decrease in the resin-impregnated strand strength and an increase in the resin dependency. Namely, when the amount of functional groups in the surface layer region of the carbon fiber subjected to the treatment for removal of functional groups is outside the range specified above in the above-mentioned terms, a carbon fiber having a high resin-impregnated strand strength cannot be obtained.

Here, the carbon fiber of this invention has an excellent mechanical property, namely an average filament strength of at least 480 kg/mm$^2$ preferably 500 kg/mm$^2$, or more, especially preferably 530 kg/mm$^2$ or more. As will be described later, a fiber property of at least 480 kg/mm$^2$ in average filament strength can be obtained for the first time by formation of a fiber surface layer region having a structural feature of an ultrathin outermost layer as in the carbon fiber of this invention. With an extremely high mechanical property of 480 kg/mm$^2$ in average filament strength, the carbon fiber of this invention has a largely improved usefulness as the reinforcing fiber for a composite material and as the carbon fiber for a reinforced materials.

The process for producing a carbon fiber according to the present invention will now be specifically described in detail.

In the present invention, "carbon fibers formed from acrylic precursors" means a carbon fiber obtained from a precursor fiber prepared from a homopolymer or copolymer comprising acrylonitrile monomer units as the main component.

According to the invention, carbon fiber is produced by a process which differs from each of the two conventional methods, one operating an electrolysis treatment for forming functional groups on surfaces of carbon fibers so as to improve the ILSS, the other operating etching with a concentrated inorganic acid to eliminate surface flaws produced in the process of the carbon fiber manufacture and then heat-treating the etched carbon fiber to remove the functional groups formed on the fiber surface through the etching so as to adjust the adhesion affinity of the carbon fiber toward a matrix resin to be used, and the production of carbon fibers is made according to the invention by operating such an electrolysis treatment which is carried out in an electrolyte aqueous solution containing nitrate ions as essential component, at an elevated temperature and using the carbon fiber as anode, that is to say, it is operated to electrochemically oxidizing the raw material of a carbon fiber so that, with the crystalline completeness of the carbon fiber maintained as much intact as possible, only an extremely limited surface region of the fiber, namely an ultrathin outermost layer thereof alone, is selectively made amorphous, that is to say, formed is a layer in which the crystalline completeness is lower and of which the removal of functional groups can more readily take place, in comparison to the central region in the carbon fiber, and thereafter a heat-treatment is operated to substantially inactivate functional groups formed in such ultrathin outermost layer through the preceding electrochemical oxidation, namely, effect removal of functional groups; in greater detail, according to the invention, an inactivation treatment is operated so as to obtain a value of 0.05 to 0.5% by weight for the content of thermally decomposable organic components and a value within a range of about 0.1 to 0.4 for the ratio $[(O_{ls}/C_{ls})]$ $(O_{1s}/C_{1s})$ to be detected by the X-ray photoelectron spectroscopy, and thereby substantially remove functional groups formed in the ultrathin outermost layer of the fiber.

As a raw material carbon fiber to be subjected to the treating process of the present invention has a higher mechanical strength, the mechanical strength of a carbon fiber obtained is advantageously higher. To obtain a carbon fiber having an average filament strength of at least 480 kg/mm$^2$, preferably 500 kg/mm$^2$ or more, more preferably 530 kg/mm$^2$ or more by the treatment of this invention, the raw material carbon fiber is desired to have, for example, an average filament strength of at least 400 kg/mm$^2$, preferably 450 kg/mm$^2$ or more. If the mechanical strength of the raw material carbon fiber is low, a fiber having an average filament strength of 480 kg/mm$^2$ or more becomes difficult to obtain even though an ultrathin outermost layer as described above is formed by that process. Thus the strength of the raw material carbon fiber to be subjected to the process is desired to be as high as possible.

As the process for producing a raw material carbon fiber of 400 kg/mm$^2$ or more in average filament strength, there is no particular limitation, and there may be used, as a precursor, an acrylonitrile fiber having a high denseness of specifically 5 to 45, preferably 10 to 30, in terms of the iodine adsorption level ($\Delta L$) as later to be described. To obtain the above-mentioned precursor, there may be used a dry-jet wet spinning method which comprises extruding an acrylonitrile (hereinafter abbreviated as "AN")- based polymer into air an inert atmosphere, and subsequently introducing the extruded filament; into a coagulation bath to coagulate it. The coagulated fiber obtained by the method may be washed with water, stretched and treated with a silicone lubricant, followed by drying. The resulting fiber, which has a smooth surface and a high denseness, is advantageously employed for the process of this invention.

The condition of oxidation and the carbonization condition are preferably so set as to provide a carbon fiber having a few structural defects such as surface flaws, internal voids, impurities and residual stress etc.

Since the acrylic precursors are converted to carbon fibers under extremely severe conditions, the structural defects are likely, especially when the fibers are exposed to a rapid temperature rise in the process of a higher temperature treatment. Thus, the carbonization conditions are advantageously set so as to avoid the structural defects. For example, the temperature rising rate is advantageously set to be about 1,000° C./min or less, preferably 500° C./min or less in the temperature ranges of from 300° to 700° C. and from 1,000° to 1,200° C. for carbonization, though it is not limited to the above-mentioned range.

The raw material carbon fiber thus obtained is subjected to an electrochemical oxidation treatment in an electrolyte aqueous solution containing nitrate ions as the indispensable component. To restrict oxidation of the carbon fiber only to a very thin surface layer region as much as possible and avoid its expansion to the inner layer region, the following treatment conditions are preferred. The nitrate ion concentration is preferably 0.1 to 16 Normal (N), more preferably 1 to 11 N. The electrolyte temperature is preferably 40° to 120° C., more preferably 50° to 100° C. The quantity of electricity in the electrolysis treatment is 50 to 600 coulomb, preferably 100 to 500 coulomb per gram of the fiber. The treatment time is preferably 0.05 to 10 min, more preferably 0.1 to 3 min.

As the electrolyte solution containing nitrate ions as the indispensable component, there can be mentioned an aqueous nitric acid solution, and solutions of a nitrate(s) capable of generating nitrate ions in a solution, such as ammonium nitrate, sodium nitrate, aluminum nitrate, potassium nitrate, or calcium nitrate.

Where any one of the electrolyte concentration, the electrolyte temperature, the treatment time, and the quantity of electricity is below the above-mentioned lower limit, the defects and residual stress in the surface layer region of the carbon fiber may not be effectively decreased nor removed by the electrochemical oxidation treatment. Where it is above the abovementioned upper limit, the oxidation may advance to the inner layer region of the carbon fiber, and hence the layer having functional groups formed by the oxidation and having a poorer crystalline completeness than that in the central region of the fiber (namely, a layer corresponding to the "ultrathin outermost layer" in the carbon fiber of this invention) becomes thick, leading to a difficulty in inactivation or removel of the functional groups in this layer.

The carbon fiber subjected to the oxidation treatment is, after washing with water and drying, subjected to a heating treatment in an inert atmosphere of nitrogen, helium, argon, or the like, or in a reducing atmosphere of hydrogen, a hydrogen compound and a metal vapor or the like at a high temperature of, for example, 600° to 1000° C., preferably 650° to 850° C. for 0.1 to 10 min, preferably 0.2 to 2 min. to inactivate the functional groups formed in the ultrathin outermost layer of the fiber by the above-mentioned electrochemical oxidation treatment, whereby the content of heatdecomposable organic components in the carbon fiber obtained may be 0.05 to 0.5 wt. %, preferably 0.1 to 0.4 wt. %, more preferably 0.15 to 0.30 wt. % and the [$O_{ls}/C_{ls}$] $O_{1s}/C_{1s}$ ratio of the carbon fiber as detected by X-ray photoelectron spectroscopy is about 0.1 to 0.4, preferably 0.15 to 0.3, more preferably 0.20 to 0.25.

Where the heating temperature and heating time in the inactivation treatment is outside the above-mentioned ranges, inactivation of the ultrathin outermost layer for substantially removing functional groups in that layer may be so insufficient that the content of heat-decomposable organic materials and the [$O_{ls}/C_{ls}$] $O_{1s}/C_{1s}$ ratio as detected by X-ray photoelectron spectroscopy may tend to be outside the above-mentioned ranges. Thus a carbon fiber obtained shows a [small] *large* resin dependency, or the mechanical strength of the carbon fiber may disadvantageously be lowered by the inactivation.

In the present invention, the above-mentioned electrochemical oxidation treatment and the functional group removing treatment may be repeated at least twice.

Thus the surface layer region formed on the surface of the carbon fiber of this invention shows substantially the same level of crystalline completeness as measured by transmission electron diffractometry (TEM) as compared with the central region in the fiber, specifically a ratio of the crystalline completeness in the fiber surface layer region to that in the fiber central region of about 0.98 or more, preferably 1.0 or more. The ultrathin outermost layer on the surface layer region of the carbon fiber of this invention thus obtained shows a poorer crystalline completeness than that in the fiber central region, specifically a ratio of the crystalline completeness in the ultrathin outermost layer to that in the central region of 1.0 or less, preferably 0.98 or less, more preferably 0.96 or less.

In addition, the amount of heat-decomposable organic components in the carbon fiber thus obtained is in the range of 0.05 to 0.5 wt. %, preferably 0.1 to 0.4 wt. %, more preferably 0.15 to 0.30 wt. %, and the functional group amount ratio [($O_{ls}/C_{ls}$)] ($O_{1s}/C_{1s}$) as detected in the outermost layer of the carbon fiber by X-ray photoelectron spectroscopy (XPS) is in the range of 0.10 to 0.40, preferably 0.15 to 0.30, more preferably 0.20 to 0.25.

The transmission electron diffractometry (TEM), the determination of the amount of heat-decomposable organic components in the carbon fiber and the X-ray photoelectron spectroscopy (XPS) are made in accordance with the following respective procedures.

Transmission Electron Diffractometry (TEM)

Sample filaments of a carbon fiber are put in order in the direction of fiber axis, and embedded in a cold-setting epoxy resin, which is then cured.

The cured carbon fiber-embedded block is subjected to trimming to expose at least 2 to 3 filaments of the carbon fiber. Subsequently, a longitudinal ultrathin slice of 150 to 200 angstroms (Å) in thickness is prepared using a microtome equipped with a diamond knife. This ultrathin slice is mounted on a gold-coated microgrid, and subjected to electron diffractometry with a high resolution electron microscope. In this case, an electron diffraction pattern from a given portion is examined by selected area electron diffractometry for detecting a structural difference between the inner and outer portions of the carbon fiber.

Figure 1B:
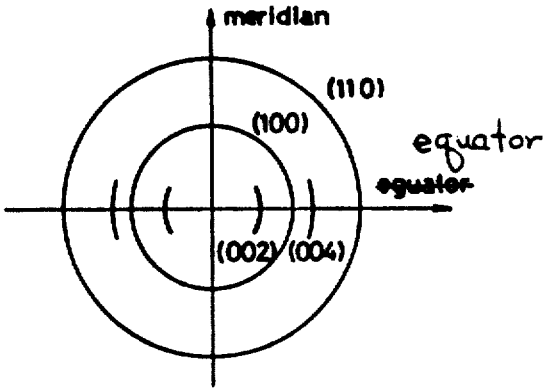

The electron diffraction photograph ranging from the edge of the above-mentioned ultrathin slice to the core thereof is taken using an electron microscope model H-800 (transmission type) manufactured by Hitachi Limited with an accelerating voltage of 200 KV and with a selected area aperture which selects an area of 0.2 μm in diameter at the specimen. FIGS. 1A and 1B show a photograph and a type diagram taken thereof, respectively, of the electron diffraction pattern thus taken.

Figure 2:
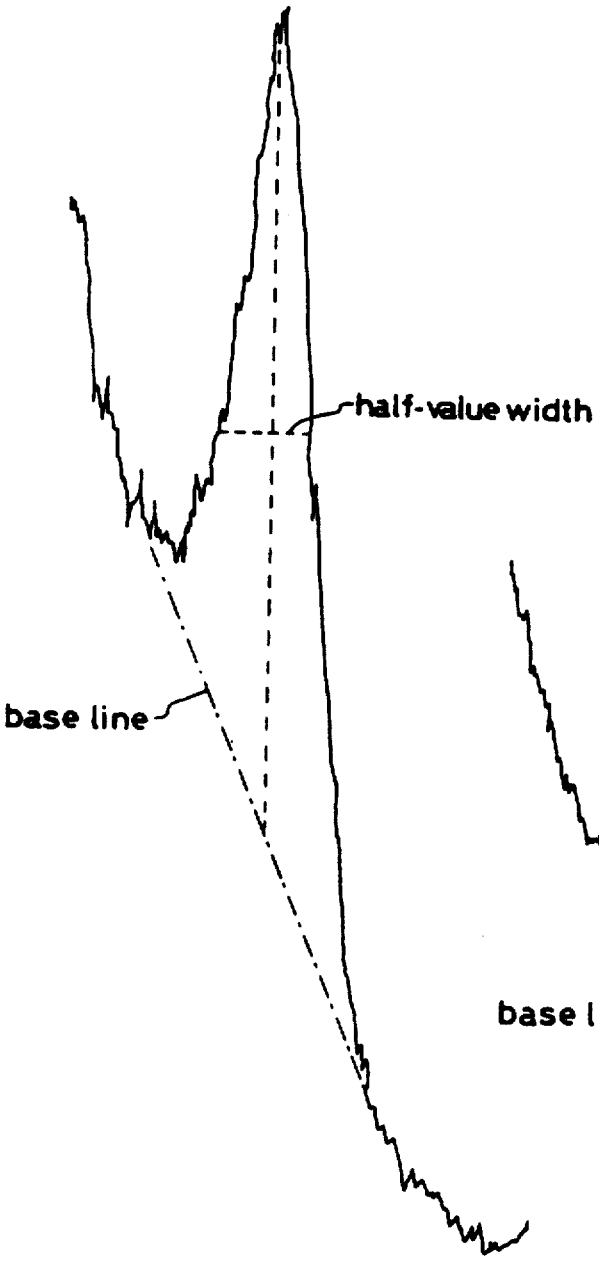
FIGS. 2 and 3 are charts each showing an example of scanning profiles of the diffraction intensity in the equatorial direction as to (002) in the electron diffraction pattern.

Subsequently, a scanning profile of diffraction intensity in the equatorial direction as to (002) in the electon diffraction pattern as shown in FIG. 1A is prepared using a densitometer manufactured by Rigaku Denki K.K. FIG. 2 is a diagram showing an example of the diffraction intensity scanning profile shown in FIG. 1A.

The photograph is taken of an about 0.1 micron-deep portion of the ultrathin outermost layer extending from the surface of the fiber, precisely with half the selected area of 0.2 μm in diameter covered by the ultrathin outermost layer and the remaining half not covered by the fiber. As for the surface layer portion, the electron diffraction photograph is taken of the portion up to about 1.5 micron, preferably in the range of 0.3 to 1.0 micron, from the surface of the fiber. As for the central portion or region of the fiber, the electron diffraction photograph is taken of the portion around the approximate center of the fiber. As to (002) in these electron diffraction patterns, the respective scanning profiles of diffraction intensity in the equatorial direction are prepared. Half value widths in these scanning profiles are determined. The reciprocal of a half value width is a parameter of the crystalline completeness. Thus the ratios of the reciprocals of the half value widths of the ultrathin outermost layer and the surface layer region, respectively, to the reciprocal of the half value width of the fiber central region are determined.

Figure 3:
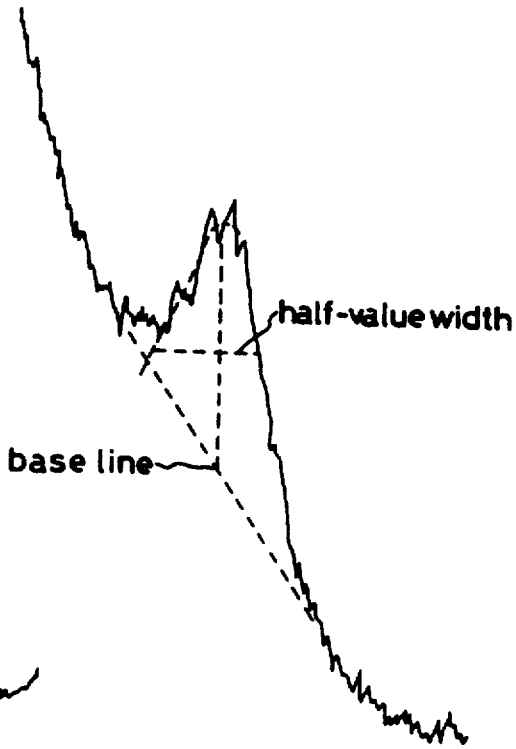

FIGS. 2 and 3 show examples of measured charts of scanning profiles of diffraction intensity in the equatorial direction as to (002) in electron diffraction patterns, which charts were obtained using the abovementioned electron diffraction photographs, and are used in determining half value widths from the scanning profiles.

In a measured chart, the middle points of noise widths in a scanning profile are taken to prepare a smooth scanning profile. As shown in FIGS. 2 and 3, a baseline is drawn, and a half value width is determined from a smoothened diffraction peak and the baseline according to the customary method. Particularly where the point corresponding to half the peak height is lower than a peak trough as in FIG. 3, a diffraction peak line is extended to find a half value width.

The surface layer portion of the carbon fiber of this invention is up to about 1.5 micron in thickness from the fiber surface, preferably in the range of from 0.3 to 1 micron from the fiber surface, more strictly ½ or less the radius of the carbon fiber and 1.5 micron or less in thickness from fiber surface. As the diameter of the fiber is decreased, the thickness of the surface layer portion is, of course, decreased.

Content of Heat-Decomposable Organic Components

About 20 mg of a carbon fiber (sample) is cleaned with a solvent to remove a sizing, etc. adhering to the fiber surface, and subjected to a measurement using a CHN-Corder Model MT-3 manufactured by Yanagimoto Seisakusho under the following conditions:

In the CHN-Corder, the temperature is elevated to 950° C. in a sample combustion furnace, to 850° C. in an oxidation furnace, and to 550° C. in a reduction furnace. Helium is allowed to flow into the Corder at a rate of 180 [m/l min] *ml/min*. The above-mentioned cleaned carbon fiber is accurately weighed and introduced into the sample combustion furnace.

Part of a decomposition gas in the sample combustion furnace is drawn out via the oxidation furnace and the reduction furnace by a suction pump for 5 min, and determined in terms of $CO_2$ amount by the thermal conductivity type detector of the CHN-Corder. The heatdecomposable organic components content are found in terms of content (wt. %) of C derived from the heat-decomposable organic components in the sample by calibration. The feature of this measuring technique resides in that the determination of heat-decomposable organic substances such as CO, $CO_2$, $CH_4$, etc. in a carbon fiber can be made by heating the carbon fiber in an atmosphere of only a helium gas without flowing an oxygen gas in a common C, H, and N element analysis apparatus.

X-ray Photoelectron Spectroscopy (XPS)

A model ES-200 manufactured by Kokusai Denki K.K. is used.

A carbon fiber (sample) is cleaned with a solvent to remove surface-stuck materials such as a sizing. Subsequently the carbon fiber is cut and spread over a copper sample bed. AlKα1 and 2 are used as the X-ray source. The inside of the sample chamber is maintained at [1*10E(−b8)] *1*10E(−8)* Torr. The surface oxygen atom to surface carbon atom ratio [$(O_{ls}/C_{ls})$] $(O_{1s}/C_{1s})$ is found from a ratio of an [$O_{ls}$] $O_{1s}$ peak area of 955 eV in kinetic energy to a [$C_{ls}$] $C_{1s}$ peak area of 1202 eV in kinetic energy.

Measurement of Average Filament Strength

The measurement is made in accordance with the filament testing method as stipulated in JIS R-7601. The average of values obtained by repeating the measurement 100 times is taken.

Measurement of Resin-impregnated Strand Strength

The resin-impregnated strand strength is found in accordance with the resin-impregnated strand testing method as stipulated in JIS R-7601. In the test, the following two kinds of resin formulations A and B and curing conditions therefor are employed and, at the same time, the resin dependency is evaluated.

| | |
|---|---|
| Resin Formulation A: | |
| "Bakelite" ERL-4221 | 100 parts |
| boron trifluoride/monoethylamine ($BF_3MEA$) | 3 parts |
| acetone | 4 parts |
| curing conditions: 130° C., 30 min | |
| Resin Formulation B: | |
| "Epikote" 828 | 35 parts |
| N,N,N',N'-tetraglycidylaminodiphenylmethane ("ELM" 434) | 35 parts |
| "Epiclon" 152 | 30 parts |
| 4,4'-diaminodiphenyl sulfone (DDS) | 32 parts |
| $BF_3MEA$ | 0.5 part |

curing conditions: The carbon fiber is impregnated with a methyl ethyl ketone solution having a resin content of 55%. The resulting impregnated fiber is stripped of the solvent in a vacuum drier at 60° C. for about 12 hours, and heated at 180° C. for about 2 hours.

The average of values obtained by repeating the strand testing 10 times is taken.

Measurement of ΔL

A dried precursor (sample) is cut to about 6 cm in length, opened by a hand card, and accurately weighed to prepared two samples of 0.5 g. One sample is put into a 200 ml Erlenmeyer flask with a ground stopper. 100 ml of an iodine solution (prepared by weighing 50.76 g of $I_2$, 10 g of 2,4-dichlorophenol, 90 g of acetic acid, and 100 g of potassium iodide, putting them into a 1 liter measuring flask, and dissolving them with water to a predetermined volume) is added to the Erlenmeyer flask, and subjected to an adsorption treatment while shaking at 60°±0.5° C. for 50 min.

The sample having iodine adsorbed thereon is washed in flowing water for 30 min, and centrifugally dehydrated. The dehydrated sample is further air-dried for about 2 hours, and opened by the hand card again. The sample subjected to iodine adsorption and the one not subjected to this procedure are put in order as to the direction of filaments, and the simultaneously subjected to an L value measurement using a color difference meter. Given $L_1$ and $L_2$ for the L values of the sample not subjected to iodine adsorption and the one subjected to this procedure, respectively, ΔL is defined by $(L_1—L_2)$, which indicate a difference between L values before and after iodine adsorption.

The effects of the present invention will be specifically described hereinbelow.

EXAMPLE 1

Ammonia was blown into a dimethyl sulfoxide (DMSO) solution of an acrylonitryle copolymer consisting of 99.5 mole % of acrylontrile (AN) and 0.5 mole % of itaconic acid and having an intrinsic viscosity [η] of 1.80 to substitute the terminal hydrogen atoms of carboxyl groups of the copolymer with ammonium groups for effecting modification of the copolymer. Thus a 20 wt. % DMSO solution of the modified copolymer was prepared.

The solution was filtered through a sintered metallic filter having a pore opening of 5μ, extruded into the air through a spinneret having 1,500 holes of 0.15 mm in diameter, run through an about 3 mm-long space of air, and introduced into a 30% aqueous DMSO solution maintained at about 30° C. to coagulate extruded fiber filaments. The coagulated fiber filaments were washed with water, and stretched by 4 times in a warm water to obtain water-swollen fiber filaments. The water-swollen fiber filaments were immersed in a mixed lubricant bath of a 0.8% aqueous solution of polyethylene glycol (PEG)-modified polydimethylsiloxane (amount of modifying PEG: 50 wt. %) and a 0.8% aqueous dispersion consisting of 85 parts of amino-modified polydimethylsiloxane (amount of modifying amino: 1 wt. %) and 15 parts of a nonionic surface active agent, and dried on a heating roll having a surface temperature of 130° C. to effect densification. The dried and densified fiber filaments were oriented by 3 times in a heated steam to obtain acrylic fiber filaments of 0.8 denier (d) in filament fineness and 1200 D in total denier.

The ΔL of the fiber filaments thus obtained was 25.

Three acrylic fiber filament yarns, each yarn having 1200 D in total denier, were bundled and bundled yarns were subjected to an air opening treatment using a ring nozzle under a pressure of 0.7 kg/cm$^2$, and heated in hot air of 240° to 260° C. with a stretching ratio of 1.05 to prepare oxidized fiber filaments having a moisture content of 4.5%.

Subsequently, the oxidized fiber filaments were carbonized in a nitrogen atmosphere having a maximum temperature of 1400° C. at a temperature elevating rate of about 250° C./min in a temperature zone ranging from 300° C. to 700° C. and at a temperature elevation rate of about 400° C./min in a temperature zone ranging 1,000° C. to 1,200° C. to prepare carbon fiber filaments. The carbon fiber filaments thus obtained were 450 kg/mm$^2$ in average filament strength and 560 kg/mm$^2$ in resinimpregnated strand strength (resin formula A). A longitudinal ultrathin slice of the carbon fiber filament was prepared, and was subjected to a measurement of crystalline completeness by selected area electron diffractometry with respect to the central portion of the fiber, the zone of about 0.1 micron in depth from the fiber surface (zone of the ultrathin outermost layer), and the zone of about 0.4 micron in depth from the fiber surface (zone of the surface layer portion). The ratios of the crystalline completeness in the about 0.1 micron-deep zone and the one in the about 0.4 micron-deep zone to the one in the fiber central portion were found to be 1.05 and 1.03, respectively. Thus the crystalline completeness in the about 0.1 micron-deep zone (the ultrathin outermost layer) was higher than that in the fiber central portion, and the crystalline completeness in the about 0.4 micron-deep zone (the surface layer) was substantially the same as that in the fiber central portion.

The raw material carbon fiber filaments thus obtained were introduced through a ceramic guide into a treatment bath filled with a 5N aqueous nitric acid solution of 80° C. in temperature, and continuously run at a rate of 0.3 m/min. Just in front of the treatment bath, there was a metal guide roller, by which a positive voltage was applied to the carbon fiber filaments, and between which and a cathode disposed in the treatment bath an electric current of 0.12A was allowed to flow. Here, the immersion length in the treatment bath for the carbon fiber filaments was about 0.2 m, the treatment time was about 40 sec, and the quantity of electricity per gram of the carbon fiber was 150 coulomb (c).

The carbon fiber filaments thus subjected to the electrochemical oxidation treatment were washed with water, dried in a heated air of about 200° C., and heated in a nitrogen atmosphere of 700° C. for about one minute to remove the functional groups in the fiber. The carbon fiber filaments thus obtained were tested and found to be 550 kg/mm$^2$ in average filament strength, and 680 kg/mm$^2$ and 670 kg/mm$^2$ in resin-impregnated strand strength for the resin formulations A and B, respectively.

An ultrathin slice of the carbon fiber filament thus obtained was prepared, and subjected to the same measurement of crystalline completeness as described above with respect to the fiber central portion, and the about 0.1 micron-deep zone and the about 0.4 micron-deep zone from the fiber surface. The ratios of the crystalline completeness in the about 0.1 micron-deep zone and the one in the about 0.4 micron-deep zone to the one in the fiber central portion were found to be 0.92 and 1.03, respectively. Thus the crystalline completeness in the about 0.1 micron-deep zone (the ultrathin outermost layer) was lower than that in the fiber central portion, and the crystalline completeness in the about 0.4 micron-deep zone (the surface layer) was substantially the same as that in the fiber central portion.

EXAMPLES 2 TO 12 AND COMPARATIVE EXAMPLES 1 TO 8

About a dozen of carbon fiber filaments shown in Table 1 were prepared by using the same raw material carbon fiber filaments and the same kinds of treatment procedures as in Example 1 under varied electrochemical oxidation conditions in an aqueous nitric acid solution and functional group removing treatment conditions as listed in Table 1.

The results of measurement of mechanical properties and fiber structures of the carbon fiber filaments thus prepared are shown in Table 1.

TABLE 1

| | | Electrochemical oxidation conditions | | | | Inactivation conditions | | |
|---|---|---|---|---|---|---|---|---|
| No. | Kind of electrolyte | Temperature (°C.) | Concentration (N) | Quantity of electricity (C/g) | Time (min) | Atmosphere | Temperature (°C.) | Time (min) |
| Example 1 | nitric acid | 80 | 5 | 150 | 0.7 | $N_2$ | 700 | 1.0 |
| Comparative Example 1 | nitric acid | 30 | 5 | 150 | 0.7 | $N_2$ | 700 | 1.0 |
| Example 2 | nitric acid | 50 | 5 | 150 | 0.7 | $N_2$ | 700 | 1.0 |
| Example 3 | nitric acid | 95 | 5 | 150 | 0.7 | $N_2$ | 700 | 1.0 |
| Comparative Example 2 | nitric acid | 80 | 0.01 | 150 | 0.7 | $N_2$ | 700 | 1.0 |
| Example 4 | nitric acid | 80 | 0.1 | 150 | 0.7 | $N_2$ | 700 | 1.0 |
| Example 5 | nitric acid | 80 | 1 | 150 | 0.7 | $N_2$ | 700 | 1.0 |
| Example 6 | nitric acid | 120 | 15 | 150 | 0.7 | $N_2$ | 700 | 1.0 |
| Comparative Example 3 | nitric acid | 80 | 5 | 30 | 0.7 | $N_2$ | 700 | 1.0 |
| Example 7 | nitric acid | 80 | 5 | 70 | 0.7 | $N_2$ | 700 | 1.0 |
| Comparative Example 4 | nitric acid | 80 | 5 | 700 | 0.7 | $N_2$ | 700 | 1.0 |

TABLE 1-continued

| | | | | | | | | |
|---|---|---|---|---|---|---|---|---|
| Comparative Example 5 | nitric acid | 80 | 5 | 150 | 0.7 | — | — | — |
| Comparative Example 6 | nitric acid | 80 | 5 | 150 | 0.7 | $N_2$ | 500 | 1.0 |
| Example 8 | nitric acid | 80 | 5 | 150 | 0.7 | $N_2$ | 600 | 1.0 |
| Example 9 | nitric acid | 80 | 5 | 150 | 0.7 | $N_2$ | 800 | 1.0 |
| Comparative Example 7 | nitric acid | 80 | 5 | 150 | 0.7 | $N_2$ | 1050 | 1.0 |
| Example 10 | ammonium nitrate | 80 | 1 | 150 | 0.7 | $N_2$ | 700 | 1.0 |
| Example 11 | aluminum nitrate | 80 | 2 | 200 | 0.7 | $N_2$ | 700 | 1.0 |
| Comparative Example 8 | caustic soda | 80 | 5 | 150 | 0.7 | $N_2$ | 700 | 1.0 |
| Example 12 | nitric acid | 80 | 5 | 150 | 0.7 | $H_2/N_2$ = 3/97 | 800 | 1.0 |

| | Resin-impregnated strand strength (kg/mm²) | | Average filament strength | Structural properties | | |
|---|---|---|---|---|---|---|
| No. | Resin formula A | Resin formula B | (kg/mm²) | Outermost layer/inner layer crystalline completeness ratio | Heat decomposable organic components content (wt. %) | XPS [($O_{1s}/C_{1s}$)] |
| Example 1 | 680 | 670 | 550 | 0.92 | 0.23 | 0.22 |
| Comparative Example 1 | 580 | 570 | 460 | 1.03 | 0.11 | 0.09 |
| Example 2 | 670 | 660 | 520 | 0.97 | 0.19 | 0.20 |
| Example 3 | 680 | 670 | 540 | 0.89 | 0.28 | 0.24 |
| Comparative Example 2 | 570 | 580 | 470 | 1.01 | 0.12 | 0.11 |
| Example 4 | 620 | 610 | 490 | 0.99 | 0.14 | 0.14 |
| Example 5 | 660 | 650 | 530 | 0.94 | 0.19 | 0.23 |
| Example 6 | 640 | 610 | 540 | 0.88 | 0.33 | 0.26 |
| Comparative Example 3 | 575 | 580 | 460 | 1.02 | 0.09 | 0.09 |
| Example 7 | 620 | 620 | 500 | 0.96 | 0.13 | 0.23 |
| Comparative Example 4 | 450 | 400 | 570 | 0.84 | 0.52 | 0.25 |
| Comparative Example 5 | 560 | 530 | 540 | 0.90 | 0.42 | 0.55 |
| Comparative Example 6 | 590 | 570 | 550 | 0.91 | 0.38 | 0.42 |
| Example 8 | 640 | 620 | 540 | 0.93 | 0.29 | 0.36 |
| Example 9 | 660 | 660 | 510 | 0.92 | 0.22 | 0.16 |
| Comparative Example 7 | 510 | 500 | 430 | 0.94 | 0.13 | 0.10 |
| Example 10 | 670 | 660 | 530 | 0.94 | 0.24 | 0.23 |
| Example 11 | 670 | 630 | 540 | 0.95 | 0.28 | 0.25 |
| Comparative Example 8 | 470 | 480 | 400 | 1.01 | 0.21 | 0.28 |
| Example 12 | 690 | 680 | 540 | 0.93 | 0.20 | 0.21 |

EXAMPLE 13

An AN copolymer (intrinsic [η]: 1.80) prepared from 99.5 mol % of AN and 0.5 mol % of itaconic acid was modified with ammonia. A 20 wt. % DMSO solution of the resulting modified copolymer was prepared, and sufficiently filtered. The spinning dope thus obtained was adjusted to 60° C., and extruded through a spinneret having 4,500 holes of 0.05 mm in diameter into a 25% aqueous DMSO solution of 60° C. at a take-up rate of 5 m/min at the time of coagulation. The coagulated fiber filaments were washed with water, stretched by 4 times in a heated water. A silicone lubricant was applied to the stretched fiber filaments, which were then dried and densified by contacting with a roller surface heated at 130° to 160° C., and oriented by 3 times in a pressurized steam. Acrylic fiber filament yarn of 0.8 denier (d) in filament fineness, 3600 D in total denier and 42 in ΔL were obtained.

The acrylic fiber filaments were oxidized and carbonized in the same manner as in Example 1 to give carbon fiber filaments, which was 470 kg/mm² in average filament strength. The ratios of the crystalline completeness in the 0.1 micron-deep zone from the surface (the ultrathin outermost layer) and the one in the 0.4 micron-deep zone from the surface (the surface layer) to the one in the fiber central portion were 1.07 and 1.05, respectively.

The carbon fiber filaments thus obtained was subjected to substantially the same electrochemical oxidation treatment as in Example 1 except that the quantity of electricity was 400 coulomb per gram of the carbon fiber. After water washing and drying, the carbon fiber filaments thus electrochemically oxidized were subjected to the same functional group-removing treatment as in Example 1.

The results of measurement of mechanical properties and fiber structures of the carbon fiber filaments thus treated were as shown in Table 2.

COMPARATIVE EXAMPLE 9

Acrylic fiber filaments of 52 in ΔL were prepared in substantially the same manner as in Example 13 except that the concentration of the coagulation bath and the take-up rate at the time of coagulation were 50% and 18 m/min, respectively.

The acryl fiber filaments obtained were oxidized and carbonized under the same conditions as in Example 1 to prepare carbon fiber filaments, which were 380 kg/mm² in average filament strength. The ratios of the crystalline completeness in a zone about 0.1 micron-deep from the fiber surface (the ultrathin outermost layer) and the one in a zone about 0.4 micron-deep from the fiber surface (the surface layer) to the one in the fiber central region were 1.05 and 1.03, respectively.

The carbon fiber filaments thus obtained was subjected to the same electrochemical oxidation treatment and functional group-removing treatment as in Example 13. The mechanical properties and structures of the carbon fiber filaments thus treated were examined. The results are shown in Table 2.

TABLE 2

| | Resin-impregnated strand strength (kg/mm²) | | Average filament strength (kg/mm²) | Structural properties | | |
|---|---|---|---|---|---|---|
| | Resin formula A | Resin formula B | | Outermost layer/inner layer crystalline completeness ratio | Heat-decomposable organic components content (wt. %) | XPS [($O_{1s}/C_{1s}$)] |
| Example 13 | 650 | 620 | 540 | 0.93 | 0.33 | 0.22 |
| Comparative Example 9 | 590 | 570 | 460 | 0.89 | 0.36 | 0.25 |

Comparative Example 10

About 20 m each of two kinds of carbon fiber filaments obtained in Example 1 and Comparative Example 9 was wound on a Pyrex glass frame, immersed in 68% conc. nitric acid at 120° C. for 45 min, washed with water for about 60 min, and dried in an oven of 120° C. for about 30 min. The carbon fiber filaments thus treated was heated in a nitrogen atmosphere in an electric furnace of 700° C. for about one minute to remove functional groups.

The results of measurement of mechanical properties and structures of the carbon fiber filaments thus obtained and those obtained in Example 1 are shown in Table 3.

As is apparent from Table 3, both of the two kinds of carbon fibers subjected to the conc. nitric acid treatment and functional group-removing treatment were poor in average filament strength, high in the content heat-decomposable organic components, and large in the resin dependency as demonstrated by the resinimpregnated strand strengths as to the resin formulae A and B as compared with the carbon fiber of this invention obtained in Example 1.

TABLE 3

| Raw material carbon fiber | Resin-impregnated strand strength (kg/mm²) | | Average filament strength (kg/mm²) | Structural properties | | |
|---|---|---|---|---|---|---|
| | Resin formula A | Resin formula B | | Outermost layer/inner layer crystalline completeness ratio | Heat-decomposable organic components content (wt. %) | XPS [($O_{1s}/C_{1s}$)] |
| the same as in Example 1 | 640 | 480 | 520 | 0.87 (0.96) | 0.51 | 0.28 |
| the same as in Comparative Example 9 | 570 | 450 | 480 | 0.85 (0.93) | 0.55 | 0.27 |

In the column of "Outermost layer/inner layer crystalline completeness ratio", the figures not enclosed by parentheses show the crystalline completeness in the 0.1 μm-deep zone from the fiber surface, while those enclosed by the parentheses show the crystalline completeness in the 0.4 μm-deep zone from the fiber surface.

We claim:

1. A process for producing an ultrahigh strength carbon fiber, which comprises the steps of:

electrochemically oxidizing an acrylic precursor based carbon fiber in an electrolyte solution comprising nitrate ions as the indispensable component and maintained at a temperature of at least 40° C. with an anode being said acrylic precursor based carbon fiber with a quantity of electricity of [about 100] *50* to 600 coulomb per gram of said fiber, followed by water washing and drying; heating the electrochemically oxidized carbon fiber in an inert or reductive atmosphere of about 600° to 1,000° C. to remove functional groups from said electrochemically oxidized carbon fiber.

2. A process for producing an ultrahigh strength carbon fiber as set forth in claim [12] *1*, wherein said acrylic precursor based on carbon fiber has an average filament strength of at least about [380] *400* kg/mm².

3. A process for producing an ultrahigh strength carbon fiber as set forth in claim 1, wherein said electrolyte solution has a nitrate ion concentration of 0.1 to 16N, and the time of electrolysis is in the range of 0.05 to 10 min.

4. A process for producing an ultrahigh strength carbon fiber as set forth in claim 1, wherein said inert atmosphere is at least one member selected from the group consisting of nitrogen, helium, and argon, and said reductive atmosphere is at least one member selected from the group consisting of hydrogen, hydrogen compounds and metal vapor.

5. A process for producing an ultrahigh strength carbon fiber as set forth in claim 1, wherein in the step of electrolysis treatment, said electrolyte solution has a nitrate ion concentration of 1 to 11N and a temperature of 50° to 100° C., said quantity of electricity is 100 to 500 coulomb per gram of said acrylic precursor based carbon fiber, and the time of electrolysis is 0.1 to 3 min, and wherein in the step of functional group removal, said inert or reductive atmosphere has a temperature of 650° to 850° C. and the time of heating is 0.2 to 2 min.

* * * * *